3,313,435
PORTABLE STORAGE LOADING AND
UNLOADING BIN
Peter M. Welk, Spokane, Wash., assignor to Welk Brothers Metal Products, Inc., Spokane, Wash., a corporation of Washington
Filed Aug. 9, 1965, Ser. No. 478,107
4 Claims. (Cl. 214—501)

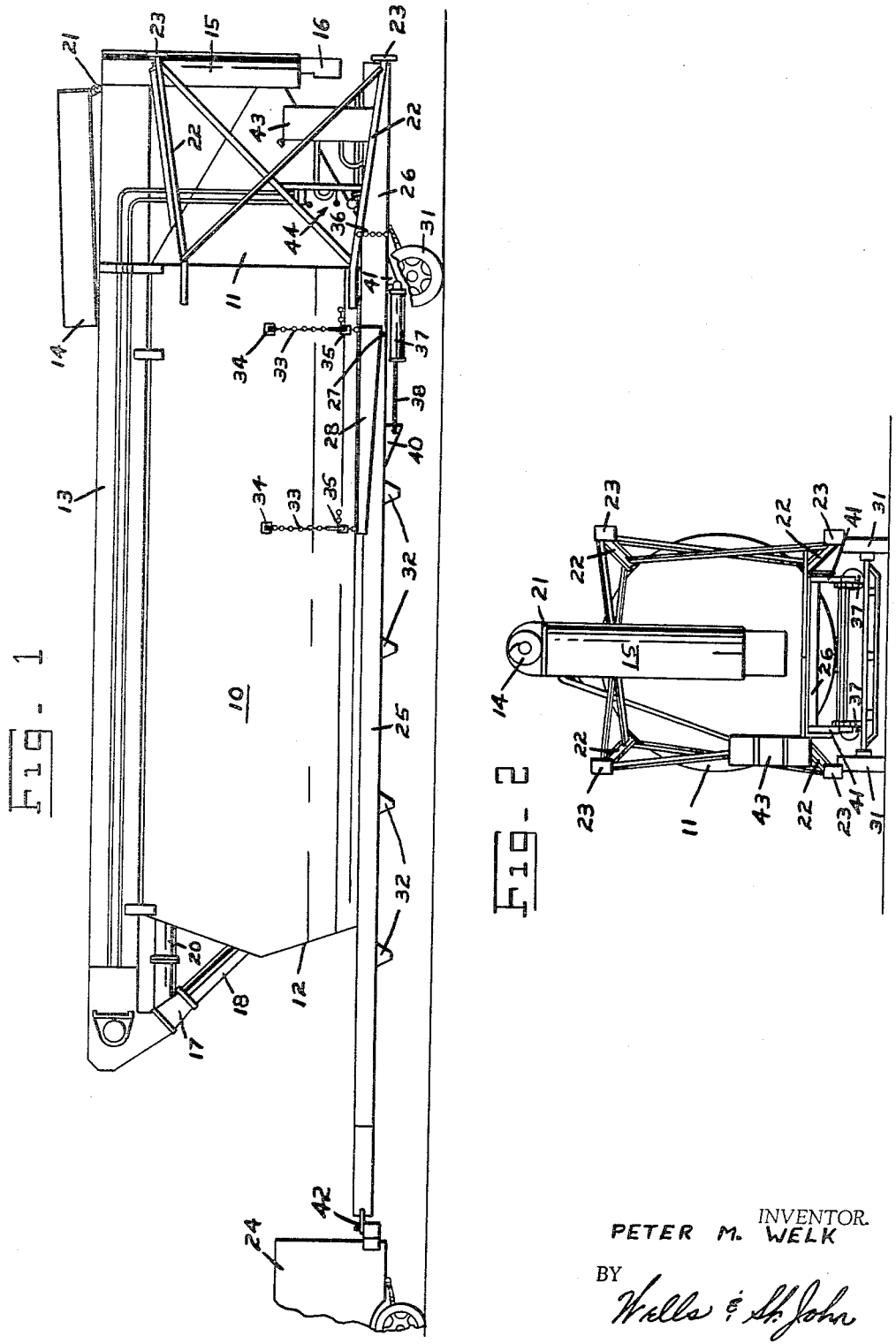

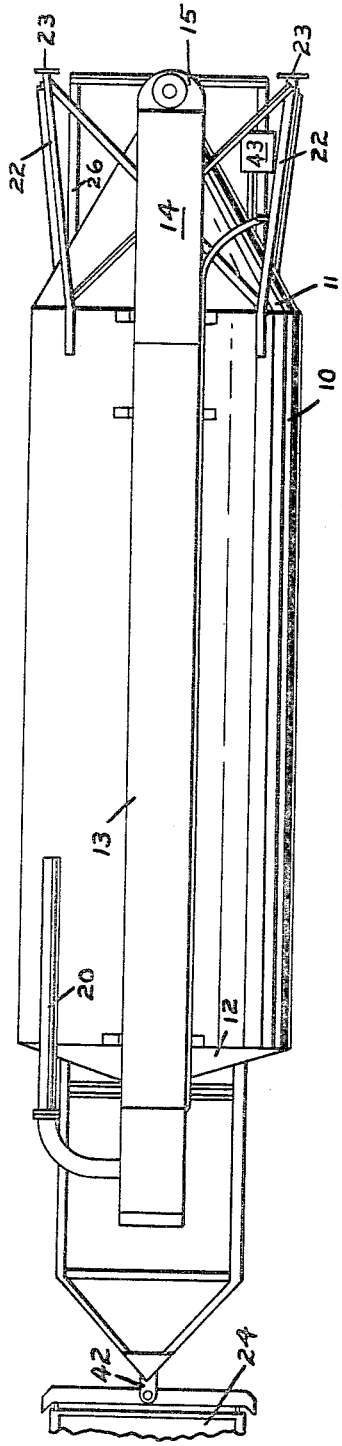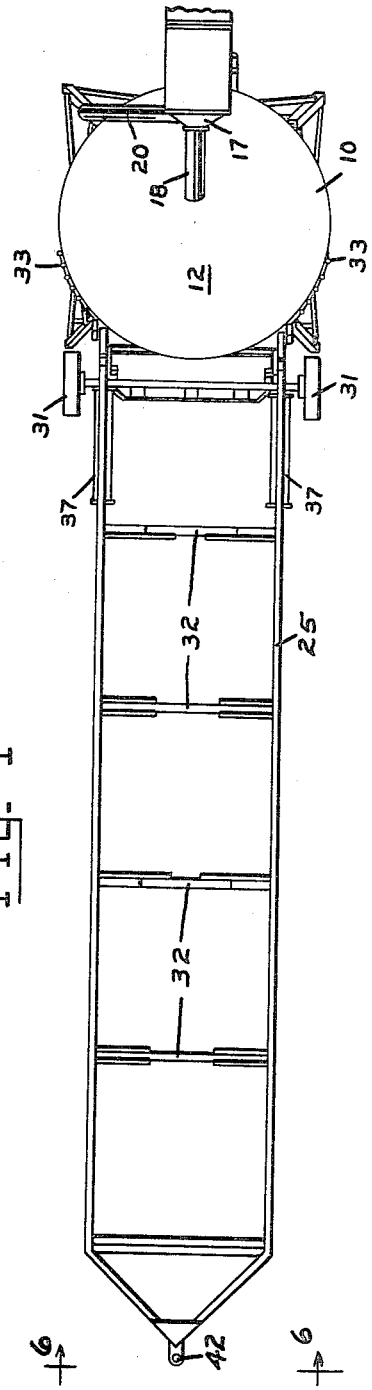

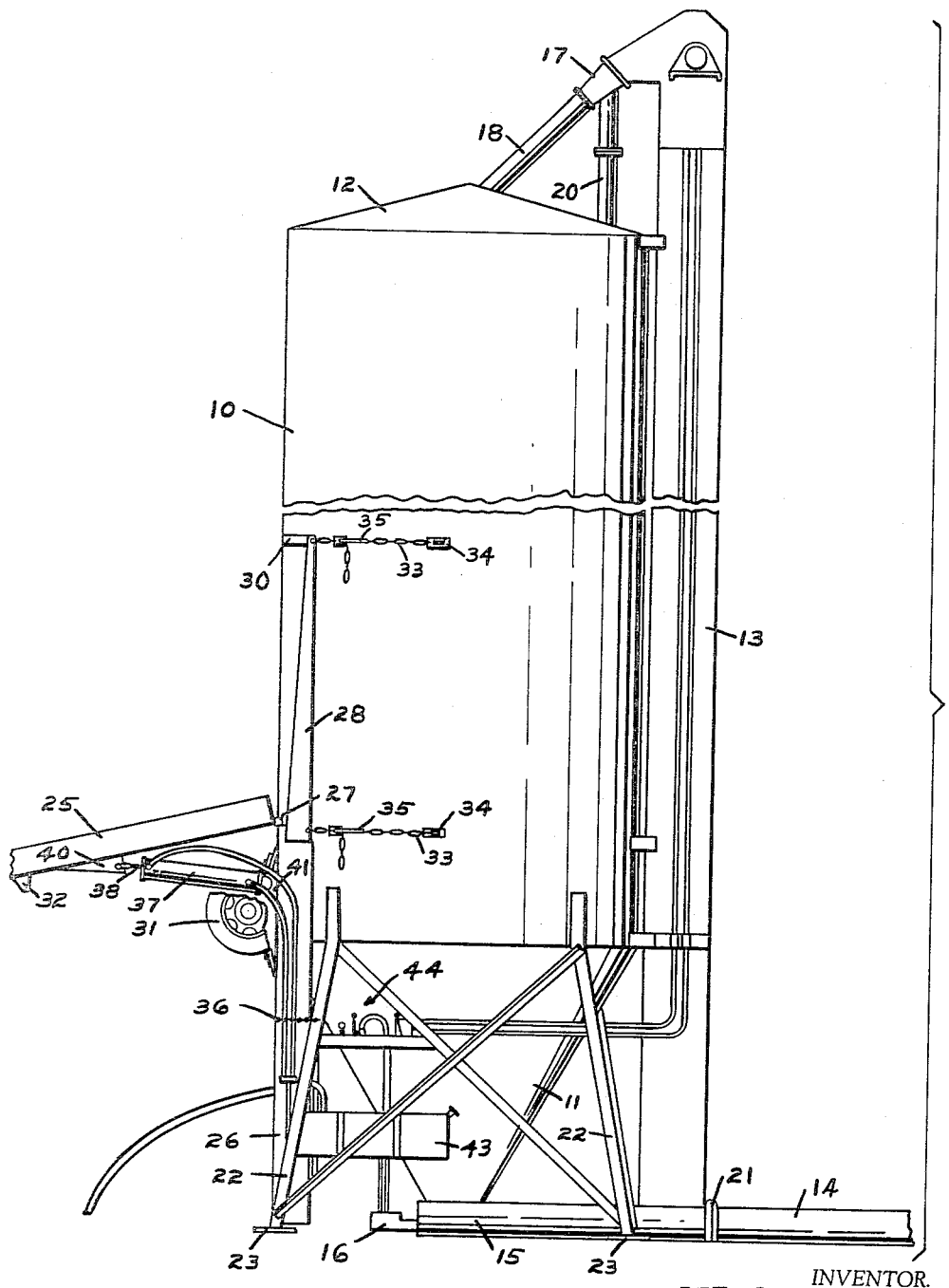

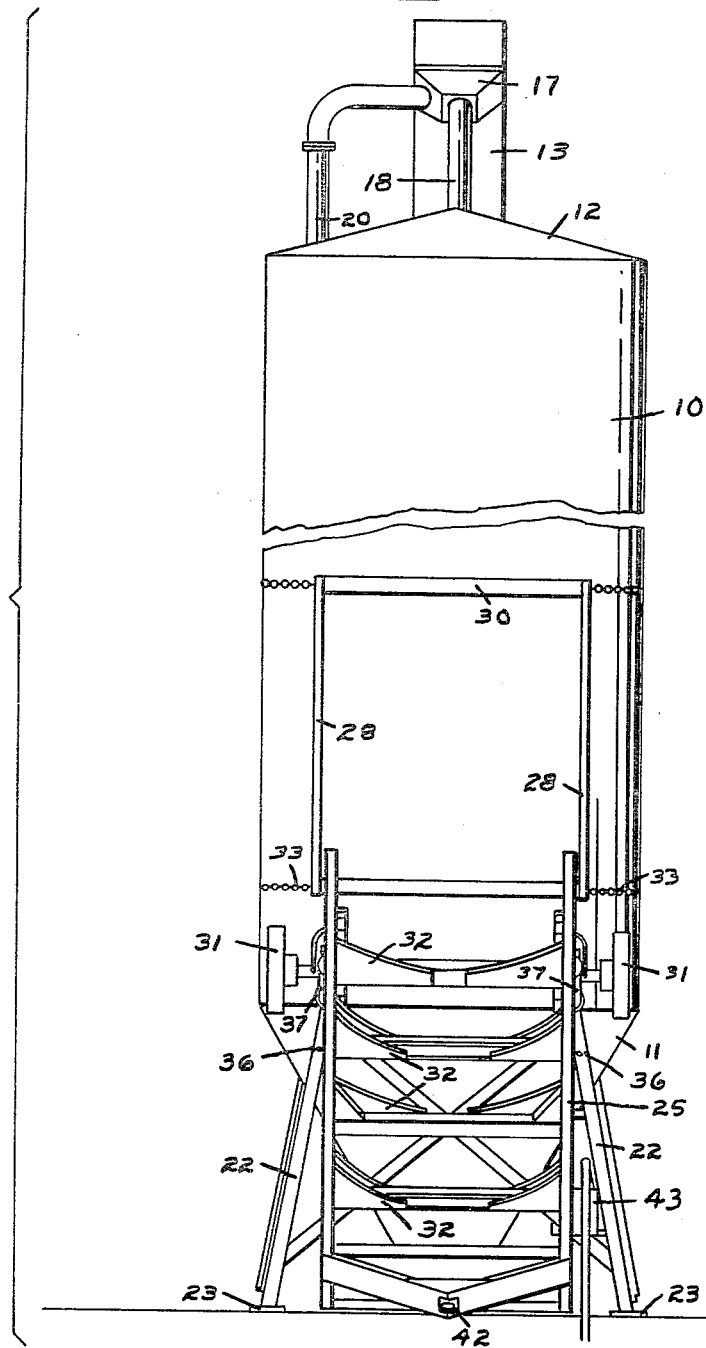

This invention relates to an apparatus for transporting and erecting a portable storage tank.

The device described below is concerned with a portable storage tank for dry or liquid materials, the tank being provided with a novel transporting apparatus releasably fixed relative to the tank. It is adapted to carry the tank in a horizontal position for transport purposes and to erect the tank to a vertical position for storage usage. The transporting apparatus, which erects the tank when desired, can be releasably detached from the tank following erection and used to transport additional tanks.

It is a first object of this invention to provide such an apparatus that is mechanically simple in its basic structure, embodying sufficient strength to erect a tank of large proportions such as might be used for temporary storage of bulk materials on a farm.

Another object of this invention is to provide such an apparatus with a maximum amount of leverage available to the erecting mechanism so that a minimum amount of force is required to lift the tank to a vertical position.

Another object of this invention is to provide a device wherein the transport frame also serves to provide the mechanical structure by which the tank is lifted to a vertical position on the supporting ground surface.

These and further objects will be evident from the following disclosure, taken together with the accompanying drawings, which illustrate a preferred form of the invention. It is to be understood that this form of the invention is not intended to limit the scope of the invention, and that minor modifications might be made without deviating from the basic concept embodied in this invention.

In the drawings:

FIGURE 1 is a side elevation view of the apparatus in its transport position, a portion of the towing truck being broken away;

FIGURE 2 is a rear view of the apparatus shown in FIGURE 1;

FIGURE 3 is a top view of the apparatus shown in FIGURE 1;

FIGURE 4 is a top view of the apparatus after erection of the tank;

FIGURE 5 is an enlarged side elevation view of the erected tank, a portion of the tank and of the forward section of the transport frame being broken away; and FIGURE 6 is an enlarged front view of the erected tank as seen along line 6—6 in FIGURE 4, a portion of the tank being broken away.

The tank with which this invention is concerned might be any type of storage tank for liquid or dry materials. In agricultural usage, the tank might be used to store grain prior to transporting the grain to an elevator. It might be used to store liquid or dry fertilizer or any other agricultural commodity where temporary field storage is desirable.

The tank shown in the drawings comprises a cylindrical body 10 leading to a conical lower section 11 and capped by a roof 12. Mounted along the side of the tank body 10 is an elevating conveyor 13. At its lower end, the elevating conveyor 13 is in communication with a feed conveyor 14 and an auger conveyor 15. Both conveyors 14 and 15 are powered by reversible hydraulic motors shown at 16. The conveyor 15 is also in communication with the lower end of the conical section 11 through a closeable gate so as to receive material from the interior of the tank. At its upper end, the elevating conveyor 13 feeds to a two-way diverter 17 that can either direct material to the interior of the tank through tube 18 or to a truck spout 20. The spout 20 extends to the side of the tank opposite to that illustrated in the drawings. The conveyor apparatus is basically conventional, although the conveyor 14, which is used to receive material dumped from a truck, is hinged at 21 so as to fold onto the tank assembly when the tank is in its transport position (FIGURES 1 through 3).

The tank is utilized for storage purposes in a vertical position, with its central longitudinal axis in an upright or vertical orientation. The bottom end of the tank body 10 is provided with a supporting base comprised of legs 22 with lower pads 23 adapted to rest upon a supporting ground surface. The tank is therefore self-supporting when in its vertical position (FIGURES 4 through 6).

For transport purposes, the tank is carried on the framework shown in the drawings. The supporting framework is a wheeled structure that can be towed by the rear end of a truck 24. The supporting framework consists of a rigid front section 25 and a rigid rear section 26. These two sections are hinged relative to one another at a pivotal connection or hinge 27 for motion about a horizontal transverse axis. The rear section 26 of the supporting framework also includes laterally spaced members 28 that extend forwardly of the hinge 27. The members 28 are rigid extensions of the rigid rear section 26. They are connected to one another at their forward ends by a curved strap 30 conforming to the radius of the tank body 10.

The framework is supported by ground engaging wheels 31 at each side of the rear section 26. The location of the wheels 31 is adjacent to the hinge 27 and spaced forwardly of the rear end of section 26. The pads 23 on the tank abut the rear end of section 26, as is evident from FIGURE 1 and also FIGURE 5.

Extending across the front section 25 are transverse braces 32 having upper curved supporting surfaces formed complementary to the curvature of the tank body 10 and adapted to cradle the body 10 so as to support its weight along the entire frame. The tank is held in place on the supporting framework by chains 33 that extend between anchoring pads 34 fixed to the body 10 and releasable brackets 35 fixed to the members 28 of the framework rear section 26. The tank is also held in place by chains 36 wrapped about the lower legs 22 and the side channels of the framework rear section 26. Thus, the tank is releasably secured to the rear section 26 of the framework and will remain in a fixed position relative to this section.

The two sections 25 and 26 of the framework are in longitudinal alignment during transport of the tank, this position being maintained by abutment of the adjacent ends of the side channels in the sections 25 and 26 directly above hinge 27. Mounted below the framework and at each side thereof are hydraulic cylinders 37 having reciprocable piston rods 38 slidably mounted therein. The outer end of each piston rod 38 is pivotally connected to a downwardly protruding bracket 40 on the forward section 25 of the framework. The rear end of each cylinder 37 is pivotally connected to a similar downwardly protruding bracket 41 fixed to the rear section 26 of the framework. The cylinder 37 and piston rod 38 at each side of the framework therefore span the area below the hinge 27. Contraction of the cylinder assemblies will result in a pivotal motion of the sections 25 and 26 relative to one another so that the hinge 27 will be lifted upwardly.

The manner in which the tank is erected is relatively simple from an operational standpoint. For transport purposes, the tank is carried as shown in FIGURE 1, with the lower pads 23 directly abutting the rear end of the rear section 26 of the mobile framework. The forward end of the front section 25 of the framework is pivotally connected to a towing truck 24 by a hitch 42, which will also permit pivotal movement of the section 25 about a horizontal transverse axis. When the tank has been located in the position at which it is to be erected, the supporting truck 24 is left in neutral gear. The hydraulic system for the tank erection mechanism can be supplied with fluid under pressure from an external source, such as a conventional pump on a tractor (not shown). A hydraulic storage reservoir 43 is shown in the apparatus mounted under the legs 22 at the tank base. The required controls are shown generally at 44 and are conventional in structure.

During use of the apparatus to erect a tank, the truck 24 remains hitched to the front end of the framework at the hitch 42. The hydraulic apparatus is actuated to draw the piston rods 38 into the hydraulic cylinders 37. This will initially cause the rear end of the rear section 26 to pivot downwardly until the pads 23 at the base of the tank come into contact with the supporting surface. Continued movement of the piston rods 38 will cause the axis of the hinge 27 to raise upwardly, drawing wheels 31 upward and pulling rearwardly on the truck 24 while pushing downwardly on hitch 42. The entire tank will therefore pivot about the lower pads 23 that are in ground contact. The forwardly protruding portions 28 of the rear framework section 26, as well as the strap 30, will push upwardly on the tank to assist in pivoting it to a vertical position. When the center of gravity of the tank reaches a location rearward of the contact point of the lower pads 23, the weight of the tank will assist in erecting it, but it will not fall rearwardly due to the downward force of the truck 24 at hitch 42 and the retarding action of the cylinders 37. The tank will be eased to a vertical position as shown in FIGURES 4 through 6.

After being erected in a vertical position, the tank is entirely self supporting, and can be detached from the transport frame by release of the chains 33 and 36. After releasing these chains, the supporting framework, which will then have the rear section 26 resting on the pads 23, can be lowered by reciprocating the piston rods 38 outwardly from the cylinders 37, bringing the framework back to the position shown in FIGURES 1 through 3. The framework can then be used to haul other tanks and erect them where desired.

Lowering of the tank to the frame for transport purposes merely involves the reversal of the steps required to elevate it. The frame would be positioned as shown in FIGURES 4 through 6, with the rear end of the rear section 26 resting on the pads 23. The chains 33 and 36 are connected to fix the location of the tank relative to the rear section 26 and the hydraulic cylinders 37 are again operated to lower the hinge 27. Again, the truck 24 will be pushed forwardly by the downward movement of the hinge 27, and the positive action of the double acting cylinders 37 will prevent the tank from falling freely at any point along its pivotal movement. The weight of the tank will first be partially carried by the pads 23, as it is pivoting downwardly onto the framework. It will later be transferred to the wheels 31 and finally to the front section 25 of the mobile framework.

The tank illustrated in the drawings is merely exemplary of a conventional tank assembly that might be used with the novel transporting and erecting mechanism. It utilizes a conveyor 14 to transfer material from a truck to the elevating conveyor 13. The elevating conveyor 13 is capable of directing material to the interior of the tank body 10 through a diverter 17 and tube 18. Material from within the tank can be directed from the conical lower section of the tank, designated by the numeral 11, through the auger conveyor 15, the elevating conveyor 13, and diverter 17 to the truck spout 20 for loading of a truck. Liquid fittings, pumps and discharge tubes can be substituted for the equipment illustrated, which is shown as the tank would be used for solid bulk materials.

The basic concept of this invention is to provide a mobile framework of rather simple construction that is capable of erecting a self-supporting tank in a vertical position. The trailing truck that hauls the supporting framework is used as the forward member on the apparatus to transmit an upwardly directed force from the supporting ground surface to the tank during erection as the hinge 27 is elevated by contraction of the piston rods 38 within hydraulic cylinders 37. The apparatus has been used in actual practice to carry tanks 30 feet high and 10 feet in diameter having a capacity of almost 2,000 cubic feet or more than 14,000 gallons. All of the equipment required for operation of the tank erecting assembly can be mounted at the base of the tank with releasable hose couplings to the hydraulic cylinders 37, so that the tank transporting and erecting assembly can be completely detached from the tank at any time the tank has been erected. This is extremely important in operations where several such storage tanks are utilized, since it eliminates the requirement of constructing and maintaining individual erecting assemblies for each tank.

Various modifications might be made in the precise structure illustrated, and for this reason, only the following claims are intended to limit or restrict the scope of this invention.

Having thus described my invention, I claim:

1. In combination with a portable storage tank adapted to be erected in a vertical position with its base resting on a supporting surface:
   a mobile longitudinal framework adapted to cradle the tank and support it for travel in a horizontal position extending longitudinally along said framework;
   surface engaging wheels mounted on said framework intermediate the longitudinal ends thereof;
   said framework comprising front and rear longitudinal sections pivotally connected to one another about a transverse horizontal axis;
   means to fixedly secure the tank to said rear section of said framework with the base thereof protruding rearwardly beyond the framework;
   and power means on said framework operably connected to said front and rear sections thereof, adapted to selectively bring said sections toward one another by raising said axis relative to the supporting surface.

2. In combination with a portable storage tank adapted to be erected in a vertical position with its base resting on a supporting surface;
   a mobile longitudinal framework adapted to cradle the tank and support it for travel in a horizontal position extending longitudinally along said framework;
   surface engaging wheels mounted on said framework intermediate the longitudinal ends thereof;
   said framework comprising front and rear longitudinal sections pivotally connected to one another about a transverse horizontal axis, said rear section having a portion thereof protruding forwardly of said axis;
   releasable means to fixedly secure the tank to said forwardly protruding portion of the rear framework section with the base thereof protruding beyond the framework;
   and hydraulic cylinder means operatively connected between said sections of said framework adapted, when activated, to bring said sections toward one another by raising said axis relative to the supporting surface.

3. An apparatus as defined in claim 2 further comprising:
   wheeled means in engagement with the supporting surface operatively supporting the front end of said framework.

4. In combination with a portable storage tank having a longitudinal central axis adapted to be erected in a vertical position with the base thereof resting on a supporting surface:

a mobile longitudinal framework adapted to fit beneath the tank with the tank axis in a horizontal position extending longitudinally along the framework, said framework comprising front and rear longitudinally aligned rigid sections pivotally connected to one another about a horizontal transverse pivotal axis, a portion of said rear section protruding forwardly beyond said pivotal axis, said rear section being substantially shorter rearward of said pivotal axis than the length of said front section;

surface engaging wheels on one of said sections;

releasable means on said rear section to fixedly secure the tank to said rear section;

ground support means operatively engaged by the front end of said front section;

and means operatively connected to said front and rear sections of said framework adapted to selectively pivot said sections relative to one another to thereby raise or lower said pivotal axis relative to said supporting surface.

References Cited by the Examiner
UNITED STATES PATENTS 2,606,676  8/1952  Dempster _____ 214—515

FOREIGN PATENTS 1,008,977  11/1965  Great Britain.

References Cited by the Applicant
UNITED STATES PATENTS 2,920,725  1/1960  Emmons.
3,024,930  3/1962  Sims.

GERALD M. FORLENZA, *Primary Examiner.*

A. J. MAKAY, *Assistant Examiner.*